Sept. 25, 1956 R. N. KNIGHTS 2,764,131
FLUID PRESSURE OPERATED JACKS
Filed Aug. 18, 1955
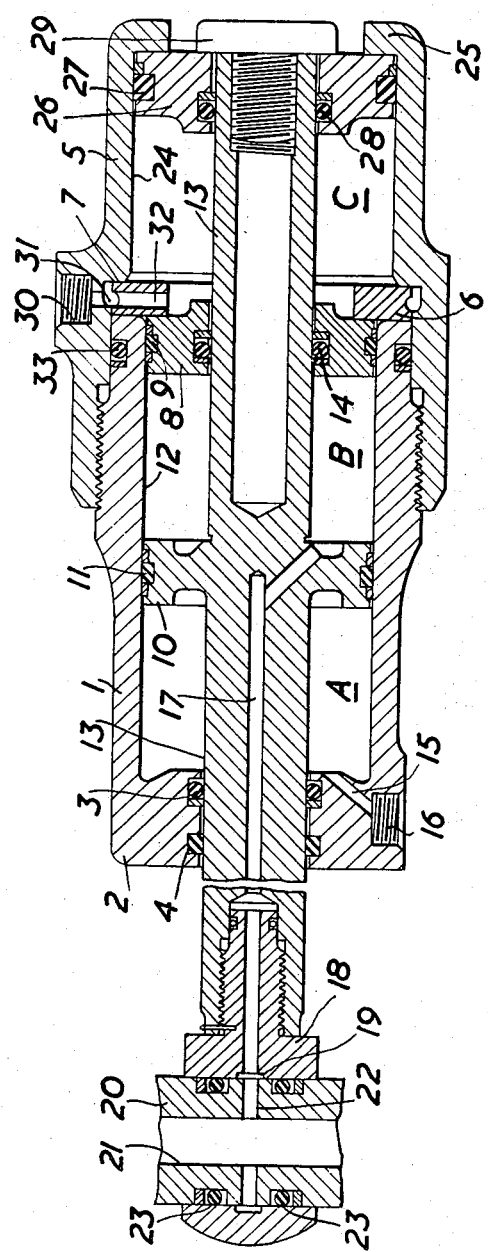
INVENTOR
Richard Northam Knights
BY *Reynolds, Beach & Christensen*
ATTORNEYS

United States Patent Office 2,764,131
Patented Sept. 25, 1956

2,764,131

FLUID PRESSURE OPERATED JACKS

Richard N. Knights, Hucclecote, England, assignor to Dowty Equipment Limited, Cheltenham, England Application August 18, 1955, Serial No. 529,197

Claims priority, application Great Britain August 31, 1954

3 Claims. (Cl. 121—38)

This invention relates to fluid pressure operated jacks of the kind wherein the jack piston is displaceable from end to end of the jack cylinder but which incorporates means by which the piston may be returned to its central position in the cylinder and restrained in this central position by the action of fluid pressure. Such a jack is known as a centering jack.

The object of this invention is to provide an improved centering jack of simplified and compact construction.

A centering jack for steering an aircraft nosewheel and constructed in accordance with the invention is illustrated by way of example in the accompanying drawing.

In this, a main cylinder 1 is closed at one end by a fixed end wall 2 having a central aperture with a packing gland assembly 3 and a wiper ring 4 mounted therein. An extension cylinder 5 is screw-threaded upon the main cylinder 1 and a stop ring 6 is interposed between the end of the cylinder 1 and an internal shoulder 7 in the extension cylinder 5. This stop ring 6 serves to retain an annular movable end wall 8 which is slidable within the bore 12 of the main cylinder 1 with a packing gland assembly 9 on its outer periphery working against the bore 12. A piston 10 with a packing gland assembly 11 on its periphery is mounted within the bore 12 of the main cylinder, and upon a piston rod 13 which extends at one end through the fixed end wall 2 and at the other end through the movable end wall 8, the latter having a packing gland assembly 14 providing a seal against the piston rod 13.

The piston 10 divides the cylinder into a chamber A having a fluid supply duct 15 opening from a screw-threaded socket 16 in the fixed end wall 2, and a chamber B opening into a central bore 17 in the piston rod 13. This bore 17 continues into a head piece 18 fixed in the piston rod and thence to an annular recess 19 in a transverse bore of the head piece 18. The head piece 18 may pivotally fit a steering crank-pin 20, shown broken away in the drawing, which has a fluid supply connection opening into its central bore 21 and by way of radial passages 22 to the recess 19. Packing gland assemblies 23 are interposed between the head piece 18 and the pin 20 on opposite sides of the recess 19 so that the pin 20 can turn in the head piece 18 without leakage of fluid.

The extension cylinder has a bore 24 of larger diameter than the bore 12 but of half its effective length, and it terminates outwardly in an in-turned flange 25. An annular piston 26 is mounted within the bore of the extension cylinder 5 against which it is sealed by a peripheral packing gland assembly 27, and upon the piston rod 13 against which it is sealed by a packing gland assembly 28. The end of the piston rod 13 which extends through the annular piston 26 is fitted with a headed screw-plug 29 which forms a stop disposed beyond the annular piston.

Admission of fluid to the chamber C of the extension cylinder is by way of a socket connection 30 in the extension cylinder which opens into an internal groove 31 around the stop ring 6, while one or more radial drill holes 32 in the stop ring open inwardly into the chamber C. A packing gland assembly 33 is recessed into the outer end portion of the main cylinder 1 and seals against the extension cylinder to render the chamber C liquid-tight.

The jack may be operated on full stroke by admission of fluid pressure to the chamber A by way of the socket connection 16, or to the chamber B by way of the central bore 17 in the piston rod 13, the chamber not under pressure being exhausted. During such full stroke working, the movable end wall 8 will remain against the stop ring 6 as if it were fixed. To centralize the jack piston 10, chambers A and B are connected to exhaust while pressure is admitted to chamber C by way of the socket connection 30. This pressure will displace the movable end wall 8 into engagement with the piston 10 and also the annular piston 27 into engagement with the flange 25, and the chamber C will expand until the head of the stop-plug 29 engages the annular piston 26 to prevent any further extension. Since the area of the annular piston 26 is greater than the area of the movable end wall 8, the annular piston 26 will exert a predominating restraining force on the main piston 10 in the central position of the latter. Contraction movement of the jack piston from its central position is resisted by the action of fluid pressure over the area of the movable end wall 8, while extension of the jack piston 10 from its central position is resisted by the action of fluid pressure on the difference in areas between the annular piston 26 and the movable end wall 8.

I claim as my invention:

1. A centering jack comprising a main cylinder having at one end a fixed end wall and at the other end a movable end wall arranged in slidable sealing relation within the main cylinder bore, a double-acting piston slidable within the bore and mounted on a piston rod which extends in opposite directions through the fixed and movable end walls respectively, an extension of the main cylinder beyond the movable end wall having a bore of larger diameter than that of the main cylinder but of half its effective length, an annular piston mounted in slidable sealing relation within the bore of the extension cylinder and upon the piston rod, and a stop fixed on the end of the piston rod beyond the annular piston, the admission of fluid pressure to the extension cylinder alone acting to move the annular piston to the outer end of said extension cylinder, and the movable end wall into engagement with the main piston so that the latter will assume an intermediate position in the main cylinder determined by the engagement of the stop with the annular piston.

2. A centering jack according to claim 1, wherein the main cylinder and extension cylinder are separately formed and secured together with a stop-ring interposed between the end of the main cylinder and an internal shoulder on the extension cylinder, this stop ring retaining the movable end wall within the bore of the main cylinder.

3. A centering jack according to claim 2, wherein fluid communication with the extension cylinder is provided by a connection in the extension cylinder wall opening by way of passages through the stop ring.

No references cited.